United States Patent
Muttreja et al.

(10) Patent No.: US 11,968,250 B2
(45) Date of Patent: Apr. 23, 2024

(54) SYSTEMS AND METHODS FOR A DISTRIBUTED DATA PLATFORM

(71) Applicant: DISH Wireless L.L.C., Englewood, CO (US)

(72) Inventors: Madhuri Muttreja, Parker, CO (US); Brian Mengwasser, Denver, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 18/068,909

(22) Filed: Dec. 20, 2022

(65) Prior Publication Data
US 2023/0247089 A1    Aug. 3, 2023

Related U.S. Application Data

(60) Provisional application No. 63/300,586, filed on Jan. 18, 2022.

(51) Int. Cl.
*H04L 67/1001* (2022.01)
*H04L 67/563* (2022.01)

(52) U.S. Cl.
CPC ...... *H04L 67/10015* (2022.05); *H04L 67/563* (2022.05)

(58) Field of Classification Search
CPC ......... H04L 65/00; H04L 67/06; H04L 67/60; H04L 67/61; H04L 67/63; H04L 67/75; H04L 67/10015; H04L 67/563; H04L 9/09; H04L 9/40; H04L 41/14; H04L 41/147; H04L 47/823
USPC ................................................ 709/203, 204
See application file for complete search history.

(56) References Cited

U.S. PATENT DOCUMENTS

| | | | | |
|---|---|---|---|---|
| 5,884,035 A | * | 3/1999 | Butman | G06F 16/958 707/E17.116 |
| 5,991,809 A | * | 11/1999 | Kriegsman | H04L 67/1008 709/229 |
| 6,823,355 B1 | * | 11/2004 | Novaes | G06F 9/466 709/248 |

(Continued)

OTHER PUBLICATIONS

International Search Report and Written Opinion, dated Apr. 18, 2023, for International Patent Application No. PCT/US2023/060777. (14 pages).

*Primary Examiner* — Thu Ha T Nguyen
(74) *Attorney, Agent, or Firm* — Seed Intellectual Property Law Group LLP

(57) ABSTRACT

A distributed data platform is able to predict whether data stored on a first network infrastructure component will be needed by a second network infrastructure component and prepares the data to be transmitted to the second network infrastructure component. The distributed data platform identifies a plurality of network infrastructure components connected to a network, and identifies data present on each component. The distributed data platform receives an indication that an event has occurred on the network and predicts whether the second network infrastructure component will require data stored by the first network infrastructure component. The distributed data platform prepares the data to be transmitted to the second network infrastructure component, and transmits the data after receiving an indication that the second network infrastructure component requires the data.

19 Claims, 9 Drawing Sheets

(56) References Cited

U.S. PATENT DOCUMENTS

| | | | |
|---|---|---|---|
| 9,414,222 B1* | 8/2016 | Dixon | H04L 67/62 |
| 10,778,539 B1* | 9/2020 | Hussain | H04L 41/0813 |
| 2001/0032257 A1* | 10/2001 | Wells | H04L 41/024 |
| | | | 709/204 |
| 2002/0083185 A1* | 6/2002 | Ruttenberg | H04L 47/10 |
| | | | 709/223 |
| 2002/0120763 A1* | 8/2002 | Miloushev | H04L 67/1008 |
| | | | 714/E11.034 |
| 2002/0161890 A1* | 10/2002 | Chen | H04L 67/1012 |
| | | | 709/226 |
| 2002/0198991 A1* | 12/2002 | Gopalakrishnan | |
| | | | H04L 67/5681 |
| | | | 709/227 |
| 2003/0014478 A1* | 1/2003 | Noble | H04L 67/1008 |
| | | | 707/E17.121 |
| 2003/0033429 A1* | 2/2003 | Myoki | H04L 61/00 |
| | | | 709/238 |
| 2003/0037165 A1* | 2/2003 | Shinomiya | H04L 9/40 |
| | | | 718/105 |
| 2003/0099254 A1* | 5/2003 | Richter | H04L 67/1097 |
| | | | 370/352 |
| 2005/0038906 A1* | 2/2005 | Banes | H04L 67/1027 |
| | | | 709/238 |
| 2005/0219564 A1* | 10/2005 | Arai | H04L 25/4902 |
| | | | 358/1.9 |
| 2006/0182246 A1* | 8/2006 | Horie | H04L 25/4902 |
| | | | 379/188 |
| 2007/0291773 A1* | 12/2007 | Khan | H04L 45/00 |
| | | | 370/401 |
| 2009/0210802 A1* | 8/2009 | Hawkins | G06F 3/0481 |
| | | | 709/204 |
| 2016/0198003 A1* | 7/2016 | Luft | H04L 67/63 |
| | | | 709/225 |
| 2017/0006135 A1* | 1/2017 | Siebel | G06Q 10/06 |
| 2017/0034023 A1* | 2/2017 | Nickolov | H04L 43/0817 |
| 2019/0141121 A1* | 5/2019 | Bernat | H04L 41/5051 |
| 2020/0404069 A1* | 12/2020 | Li | H04L 67/59 |
| 2021/0006614 A1* | 1/2021 | Oyman | H04N 19/30 |
| 2021/0105338 A1* | 4/2021 | Oyman | H04L 12/2876 |
| 2021/0329062 A1* | 10/2021 | Reisbick | H04L 67/63 |
| 2022/0124469 A1* | 4/2022 | Liao | H04L 67/34 |
| 2022/0132315 A1* | 4/2022 | Kolekar | H04W 12/106 |
| 2022/0141662 A1* | 5/2022 | Liao | H04W 12/37 |
| | | | 726/1 |
| 2022/0141708 A1* | 5/2022 | Arrobo Vidal | H04L 69/22 |
| | | | 370/329 |
| 2022/0287038 A1* | 9/2022 | Singh | G06F 9/3877 |
| 2023/0247089 A1* | 8/2023 | Muttreja | H04L 67/60 |
| | | | 709/203 |
| 2023/0283691 A1* | 9/2023 | Kundu | H04L 67/61 |
| | | | 455/414.1 |
| 2023/0308853 A1* | 9/2023 | Ding | H04W 8/18 |
| | | | 455/418 |
| 2023/0396641 A1* | 12/2023 | Hebbagodi | H04L 63/1466 |

* cited by examiner infrastructure component data table

| Component ID | Data Produced by Component | Data Consumed by Component |
|---|---|---|
| NDC Orchestrator | Inventory Data requested by a network infrastructure component | Inventory Data received from an inventory database; Data received from an Onboard Function |
| OSS Inventory | Virtual, physical, or logical instance data; location data; change/metadata; relationships between data | Element state data; requested inventory data; physical/expected/planned metadata |
| RDC | n/a | Inventory data requested by a network infrastructure component |
| RDC OBF | Data regarding faults, alerts, performance metrics, and other Onboard Function data | Inventory Data received from an inventory database |
| ... | ... | ... |

*Fig. 3*

SYSTEMS AND METHODS FOR A DISTRIBUTED DATA PLATFORM

CROSS-REFERENCE TO RELATED APPLICATIONS

This application claims the benefit and priority to U.S. Provisional Patent Application Ser. No. 63/300,586, filed on Jan. 18, 2022 and entitled "SYSTEMS AND METHODS FOR A DISTRIBUTED DATA PLATFORM," the entirety of which is hereby incorporated by reference.

In cases where the present application conflicts with a document incorporated by reference, the present application controls.

BRIEF SUMMARY

Various components within a network infrastructure, such as towers, data centers, data lakes, third party components, e.g. customer devices operating on the network, including the local storage and computing capabilities of the customer devices, and other network infrastructure components (collectively "network infrastructure components") produce and consume large amounts of data. Typically, network infrastructure components send and receive data from many other network infrastructure components. In the case of a large network, such as a nation-wide network, this may cause delays in data being transferred, as it must be transferred across the country. Additionally, in the case of a large network infrastructure, such as a nation-wide 5G network, the volume of the data produced may be larger than the total throughput of the network. Thus, normal storage techniques, such as data warehouses, data lakes, and other data storage techniques, are unable to adequately handle the large amount of data which must be stored. Furthermore, the production and consumption of data, along with transferring data across multiple components may cause unnecessary duplicate data to be created.

The embodiments disclosed herein address the issues above and thus help solve the above technical problems and improve the technology of network infrastructure by providing a technical solution that provides a distributed data platform used to manage data storage and data movement throughout the network. Additionally, the embodiments disclosed herein include guiding principles for managing data within the distributed data platform. Furthermore, the embodiments disclosed herein are able to be used to predict whether data will be required by a network infrastructure component, and to use that prediction to prepare the data to be transferred to the network infrastructure component which will require the data.

In some embodiments, a distributed data platform electronically identifies network infrastructure components connected to a network, identifies data present on each network infrastructure component, receives an indication that an event has occurred on the network, predicts that a portion of data stored on a first network component will be required by a second network infrastructure component, prepares the portion of data to be transmitted, receives an indication that the second network infrastructure component requires the portion of data, and causes the portion of data to be transmitted to the second network infrastructure component. In some embodiments, a network infrastructure component transmits data indicating the data present on the network infrastructure component to a distributed data platform system, receives an indication that a portion of the data stored by the network infrastructure component is to be transmitted to a second network infrastructure component, prepares the portion of the data to be transmitted, receives an indication that the second network infrastructure component requires the portion of the data, and transmits the portion of the data to the second network infrastructure component. In some embodiments, a network infrastructure data structure includes information specifying a plurality of network infrastructure components, information indicating data stored by each network infrastructure component, and information indicating that an event has occurred on the network, and is used to predict whether a network infrastructure component will require certain data present on a network infrastructure component.

BRIEF DESCRIPTION OF THE SEVERAL VIEWS OF THE DRAWINGS

FIG. 3 is a table diagram representing an infrastructure component data table 300, according to various embodiments described herein.

DETAILED DESCRIPTION

Figure 1A:
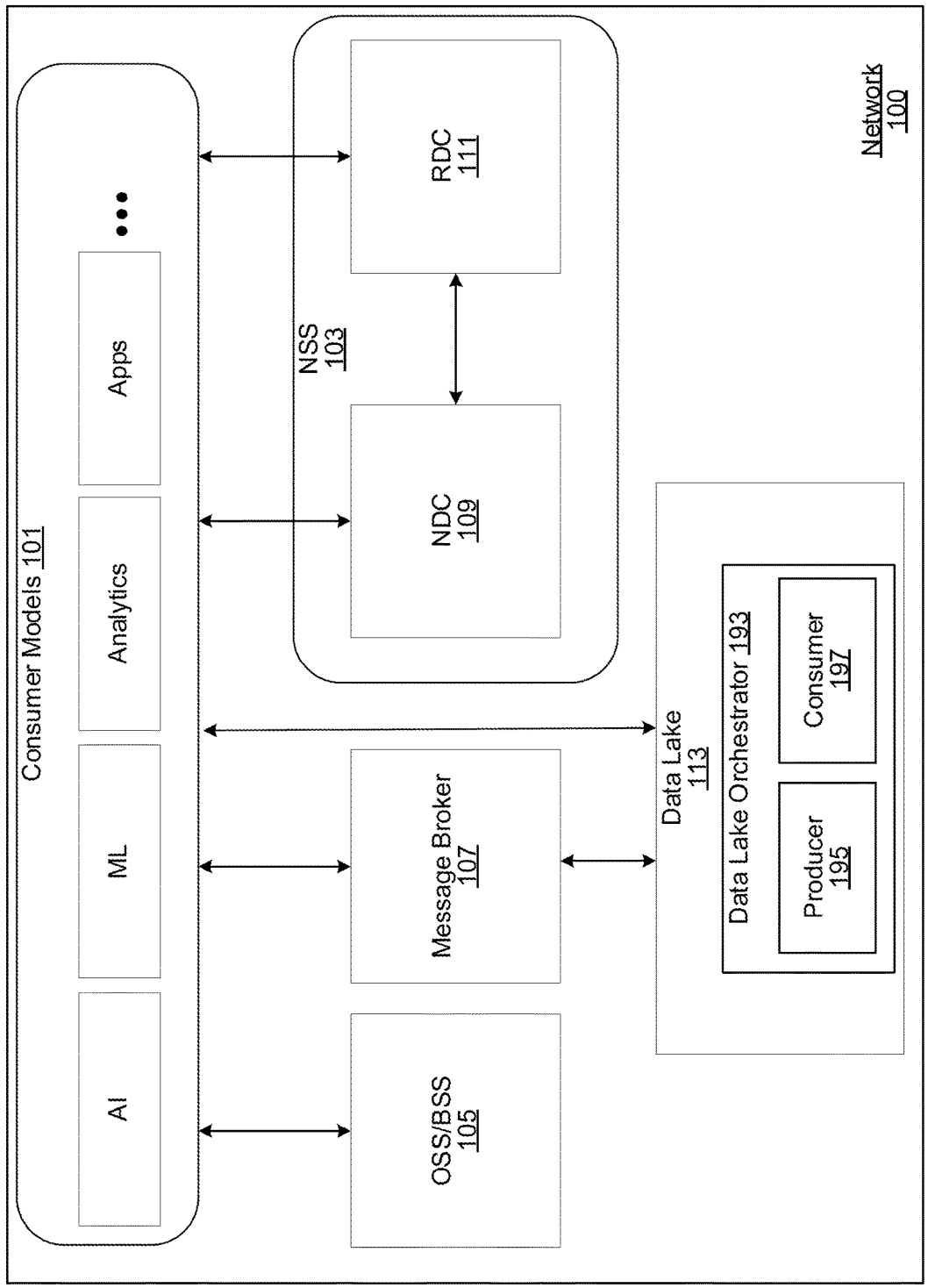
FIG. 1a is a display diagram showing an example network in which the distributed data platform operates, according to various embodiments described herein.

Devices, network infrastructure, such as towers, data centers, etc., and other parts of a network's infrastructure ("network infrastructure components") produce and consume large amounts of data in order to ensure that a network, such as a telephone network, networks, and other networks which can span regions, nations, internationally, etc. The data produced and consumed by network infrastructure components is typically stored for use by the network infrastructure component producing the data, or for other network infrastructure components which may consume the data. Currently, the data produced by these components is stored in large warehouses or data lakes. However, transmitting data from one infrastructure component to another, or from a data lake or data warehouse to a network infrastructure component, can cause delays in data transmission, due to the distance that the data must travel. Furthermore, the amount of data used to manage and perform the normal functions of such a large network is larger than the total throughput of the network itself.

A common remedy is to replicate the data, such that it is stored in multiple data lakes or warehouses, in order to lessen the distance traveled by the data. However, this solution causes further issues because each copy of the data must be updated when data is updated, which requires expending additional computing resources and computing power. Additionally, the amount of data is increased with each piece of data duplicated, which further exacerbates bandwidth issues, as well as other issues, caused by the data being larger than the throughput of the network. Thus, simply replicating the data, such as by having multiple data lakes or data warehouses to store copies of the data, is an inadequate solution for large networks, such as entire regional, nationwide, or international networks, with large amounts of network infrastructure components.

The embodiments disclosed herein address the issues above and help solve the above technical problems and improve the technology of network infrastructure and data management for large networks by providing a technical solution that provides a distributed data platform used to manage data storage and data movement throughout the network. Additionally, the distributed data platform, or distributed data platform system, disclosed herein include guiding principles for managing data within the distributed data platform. A distributed data platform is further able to predict which network infrastructure components will require which data when certain events occur on the network, and to use this prediction to prepare data for transmission to the network infrastructure component, as well as to transmit the data to the network infrastructure component when necessary. The distributed nature of the distributed data platform further allows network infrastructure components to be more easily swapped out as newer, or upgraded, versions become available, than current methods of managing large amounts of data for a network.

In some embodiments, the distributed data platform identifies a plurality of network infrastructure components which are connected to a network. The distributed data platform may identify data present on each network infrastructure component. The distributed data platform may receive an indication that an event has occurred on the network, such as an error, an alert, a request by another network infrastructure component or an end user, or any other event which may occur on a network. The distributed data platform may predict that data stored on a first network infrastructure component will be requested by a second network infrastructure component based on the indication that the event has occurred. The distributed data platform may prepare the data to be transmitted to the second network infrastructure component. The distributed data platform may receive an indication that the second network infrastructure component requires the data. The distributed data platform may cause the data to be transmitted to the second network infrastructure component in response receiving the indication that the second network infrastructure component requires the data.

In some embodiments, the data is transmitted between the network infrastructure components in near real-time. The distributed data platform may utilize a message broker ("event streaming data source" or "broker"), such as a Kafka message broker, to transmit the data, or to cause the data to be transmitted. The distributed data platform may cause the data to be streamed from one network infrastructure component to another. An example of an event streaming data source is that which is provided by the Apache Kafka® event streaming platform. Such event streaming platforms may combine capabilities and functionality to publish (write) and subscribe to (read) streams of events, including continuous import/export of data from other systems; store streams of events durably and reliably; and process streams of events as they occur or retrospectively.

In some embodiments, the data transmitted between the network infrastructure components is a model, such as a data model, simulation model, AI or machine learning model, analytics model, application, search, application programming interface (API), or another type of algorithm or code which operates on the data used by network infrastructure. Models may perform one or more operations on the data, such as scans, searches, processes, reductions, transformations, or other operations which may be performed on data. The model may be used to process data accessible to the network infrastructure component receiving the data. A network infrastructure component may alter an aspect of the model as part of using the model. In some embodiments, after a network infrastructure component updates the model, the network infrastructure component indicates to other network infrastructure components that the model has been altered. The network infrastructure component which altered the model may cause the altered model to be transmitted to other network infrastructure components. The network infrastructure component may cause an indication of the alteration made to the model to be transmitted to other network infrastructure components. The alteration may include altered weights for the model, such as altered weights for a statistical model, altered weights for a machine learning model, etc. In some embodiments, in order to support the transmission of a model between network infrastructure components, each data pool for the respective network infrastructure component has enough memory to store data relevant for the model's operation and the capability to apply the data to the model.

In some embodiments, preparing the data to be transmitted to another network infrastructure component includes transmitting the data to an intervening network infrastructure component. The intervening network infrastructure component may be geographically closer to the final destination of the data than the network infrastructure component which originally produced the data. Thus, the data is able to be transmitted to its final destination in a shorter period of time when it is required by the network infrastructure component at the final destination.

In some embodiments, the distributed data platform includes one or more data standards, or data policies, which each network infrastructure component must follow when creating or receiving data. The distributed data platform may examiner the data produced by a network infrastructure component to determine whether the component is producing data according to the standards. The distributed data platform may transmit a message, alert, or other indication, to a network operator when the network infrastructure component is not producing data according to one or more data standards which are based on one or more guiding principles for the distributed data platform, or one or more guiding principles for the data included in the distributed data platform. The guiding principles for the distributed data platform may be based on one or more key principles, such as: ensuring the data platform is platform and architecture agnostic; ensuring the data platform is modular and configuration driven (such as through containerization), dynamic, or uses adaptive provisioning; ensuring interoperability through vendors and network components; ensuring components are available for self-service; ensuring data management, movement, processing, etc., is business value driven; ensuring the data platform supports multi-tenancy; ensuring the data governance is controlled by the entity controlling the network; ensuring the data quality throughout the platform; ensuring the data platform has operational resilience and excellence; ensuring the data platform includes automation, such as self-healing, ztp, and other automation used to manage a network; utilizing data operations and model operations; and other principles used to guide the configuration of a data platform. The guiding principles for the data may be based on one or more key principles, such as: the network provider owning all of the data; democratizing the data; defining data agreements; using a data lake for support; storing data schema-free; using an ecosystem of data products; avoiding vendor lock-in data designs; self-documenting data models and products; utilizing domain driven data products; and other principles used to guide the configuration of data standards.

In some embodiments, a network infrastructure component transmits a portion of the data it has stored to one or more other network infrastructure components. The network infrastructure component may be controlled by an entity other than the entity which controls the network (referred to as a "third party"). In some embodiments, the network infrastructure component uses a message broker, such as a Kafka message broker, to transmit the portion of the data. In some embodiments, the network infrastructure component streams the portion of the data. In some embodiments, the portion of the data includes a model. In some embodiments, the network infrastructure component receives an indication that the model was altered, and alters the model based on the indication that the model was altered. In some embodiments, preparing the portion of the data to be transmitted includes receiving an indication of an intermediary network infrastructure component and transmitting the data to the intermediary network infrastructure component.

In some embodiments, the distributed data platform utilizes a network infrastructure component data structure, which includes information describing each network infrastructure component in the distributed data platform, to perform the functions described herein. The network infrastructure component data structure may include information describing the data stored by each network infrastructure component. The data stored by a network infrastructure component may include a model. The network infrastructure component data structure may include a location, such as a geographic location, a relative location, etc., of one or more network infrastructure components. The network infrastructure component data structure may include data describing the relationship between one or more network infrastructure components. The network infrastructure component data structure may include information indicating a network infrastructure component which is used to prepare data transmitted from one network infrastructure component to another. The network infrastructure component data structure may include information specifying one or more data standards regarding how data is stored, produced, consumed, or managed, or regarding some combination of how the data is stored, produced, consumed, or managed.

In some embodiments the distributed data platform includes a centralized management function. The centralized management function may be used to architect how information is accessed, how frequently information is updated, the life cycle of models, etc. The centralized management function may determine how data is consumed, how models are executed, how network infrastructure components behave when receiving certain data or models, etc. The centralized management function may perform scheduling in order to manage data between network infrastructure components. The centralized management function may control one or more of: access to data and models, policies for data and models, auditing of data and models, orchestration of requests for data and models, etc.

In some embodiments, the distributed data platform includes an access control function. The access control function may be implemented as part of a centralized management function. The access control may be implemented by using accounts, access management rules, application trigger tags, or other mechanisms to control access to data. The access control function may be implemented as a centralized system. The access control function may be implemented by using a network of access systems which are synchronized. The distributed data platform may control access to the data based on the type of data requested. The distributed data platform may control access to data by encrypting the data. In some embodiments, some data which is related may be stored in multiple separate physical network infrastructure components in order to increase security, and are only allowed to be accessed together when a network infrastructure component has access to all of the related data. For example, a two sets of data may be interrelated, but stored on two separate network infrastructure components. A third network infrastructure component would need access to both of the network infrastructure components storing the data in order to access the two sets of data at the same time.

In some embodiments, the distributed data platform includes a centralized catalog and model. The centralized catalog and model may be implemented as part of a centralized management function. The centralized catalog and model may be used by the distributed data platform to understand data obtained from network infrastructure components. The centralized catalog and model may be used to facilitate the orchestration of requests, such as a request for data, a request for a model, a request for specified data to be applied to a model, etc. The centralized catalog and model may be used by the centralized management function to determine where and how to fulfill a request.

In some embodiments, the distributed data platform registers a new data source. A new data source may be registered when a network infrastructure component is connected to the network. The distributed data platform may ensure that data and models produced, consumed, used by, generated, etc., by the data source follows the policies, rules, etc., used by the distributed data platform. The distributed data platform may ensure that requests for data or models by the new data source are made in accordance with the policies, rules, etc., used by the distributed data platform. The distributed data platform may ensure that data obtained from the new data source is stored in a certain format. In some embodiments, the format is used by all of the network infrastructure components which are included in the distributed data platform, such that the data does not need to be converted to another format for a network infrastructure component to use the data.

In some embodiments, when a network infrastructure component makes a new request for data or a model, the distributed data platform performs the data operations, data processing, data movement, etc., required to provide the data or model to the network infrastructure component. The distributed data platform may ensure that the request, the requested data or model, the transmission of the requested data or model, etc., conform to the policies, rules, etc., used by the distributed data platform. For example, the distributed data platform may ensure that the network infrastructure component requesting the data or model has access to the data or model in the first place, including ensuring that the proper credentials are acquired to grant access. The distributed data platform may ensure that the requested data or model is transmitted in a certain format.

In some embodiments, the distributed data platform uses one or more of: cataloging, metadata logging, policies, etc., to control the use of, access to, consumption of, and process of obtaining data.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

FIG. 1a is a display diagram showing an example network 100 in which the distributed data platform operates, according to various embodiments described herein. It is to be appreciated that FIG. 1a illustrates just one example of a network in which a distributed data platform operates, and that various embodiments discussed herein are not limited to the use of such an environment. The network 100 includes consumer models 101, a Network Switching Subsystem (NSS) 103, an operations support system and business support system (OSS/BSS) 105, a message broker 107, and a data lake 113. The NSS 103 includes a national data center (NDC) 109 a regional data center (RDC) 111. The data lake 113 includes a data lake orchestrator 193, which includes a producer 195 and a consumer 197.

The network 100 is a network, communication system, or networked system (not shown), NSS 103, OSS/BSS 105, message broker 107, date lake 113, NDC 109, RDC 111, and network infrastructure devices (not shown), and other network functions (not shown), may be coupled, and on which the consumer models 101 operate. Non-limiting examples of such a network or communication system include, but are not limited to, an Ethernet system, twisted pair Ethernet system, an intranet, a local area network (LAN) system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cellular networks, cable networks, or the like. One or more endpoint devices, such as PCs, tablets, laptop computers, smartphones, personal assistants, Internet connection devices, wireless LAN, WiFi, Worldwide Interoperability for Microwave Access (WiMax) devices, or the like, may be communicatively coupled to the network and/or to each other so that the plurality of endpoint devices are communicatively coupled together. Thus, such a network enables the consumer models 101, NSS 103, OSS/BSS 105, message broker 107, date lake 113, NDC 109, RDC 111, other network infrastructure components, and other network functions, used as part of the distributed data platform, to communicate with each other.

The consumer models 101 may include artificial intelligence, machine learning models, analytics models, data models, applications, and other models. The consumer models 101 may be stored on, used by, accessed, etc., network infrastructure components. The consumer models 101 may also communicate with, access, use, etc., other consumer models 101. The consumer models 101 are used by the network 100 to perform at least some of the functions necessary to operate the network 100.

Figure 1B:
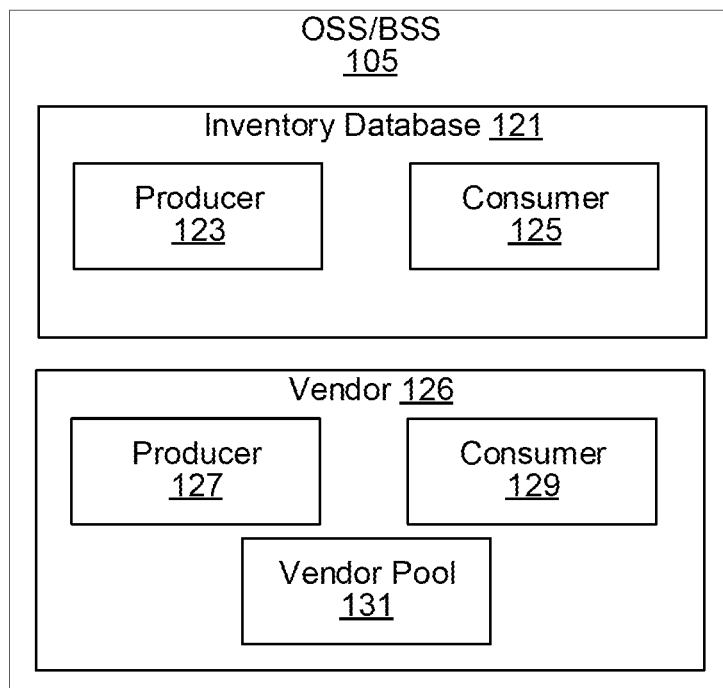
FIG. 1b is a display diagram showing an example OSS/BSS, according to various embodiments described herein.

FIG. 1b is a display diagram showing an example OSS/BSS 105, according to various embodiments described herein. The OSS/BSS 105 includes a connection to a third party component, such as an inventory database 121, or other databases for defined purposes, for example maintaining an inventory of network elements, applications, and topology, and connections to other third party vendors such as the vendor 126. The inventory database 121 includes a producer 123 and consumer 125. The producer 123 represents data produced by the inventory database 121 and the consumer 125 represents data consumed by the inventory database 121. The vendor 126 includes a producer 127, a consumer 129, and a vendor pool 131. The producer 127 and consumer 129 are similar to the producer 123 and consumer 125, respectively. The vendor pool 131 represents a pool of data stored by the vendor 126. The various vendor pools, data pools, and data lakes, which appear in FIGS. 1a-1e, may be logically separated datasets within a region, or based on location. While FIG. 1b includes an OSS/BSS 105, one of skill in the art would recognize that an NSS, OSS, BSS, or any combination of the three, could be used by the distributed data platform.

Figure 1C:
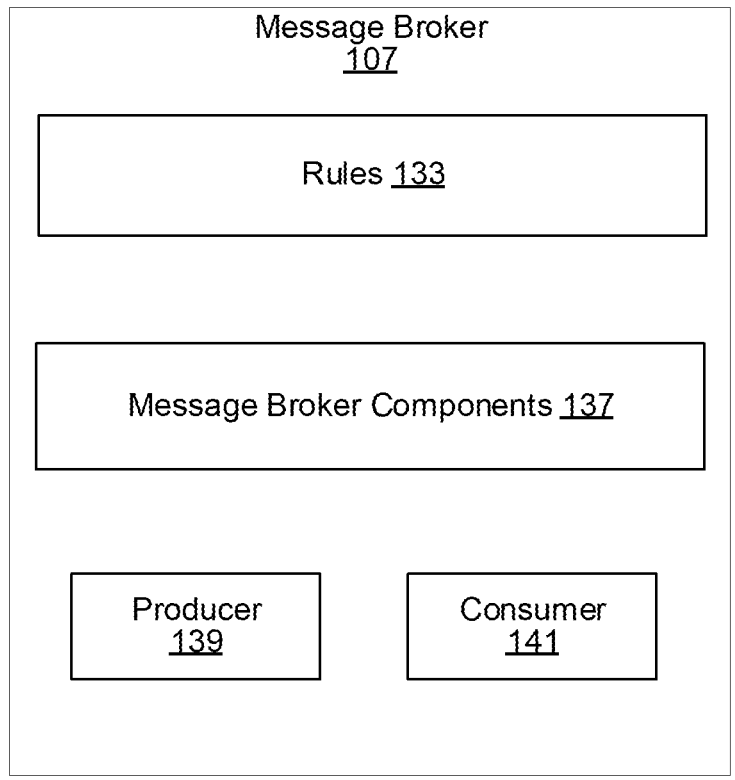
FIG. 1c is a display diagram showing an example message broker, according to various embodiments described herein.

FIG. 1c is a display diagram showing an example message broker 107, according to various embodiments described herein. The message broker 107 is used to facilitate communication between network infrastructure components. In some embodiments, the message broker 107 enables network infrastructure components to stream data to each other. In some embodiments, the role of the message broker 107 is performed by a Kafka message broker. The message broker 107 includes rules 133, components 137, a producer 139, and a consumer 141. The rules 133 include rules for transmitting and receiving data from one network infrastructure component to another. The components 137 include components of the message broker 107 which are used to facilitate communication between network infrastructure components. The producer 139 and consumer 141 operate in a similar manner to the producer 123 and consumer 125, respectively.

Figure 1D:
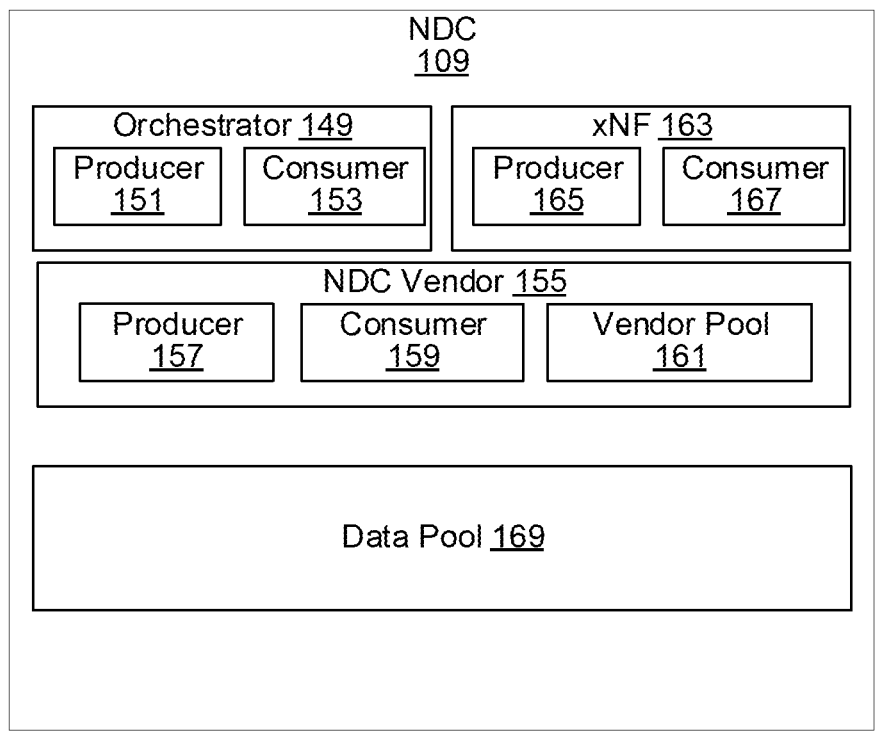
FIG. 1d is a display diagram showing an example NDC, according to various embodiments described herein.

FIG. 1d is a display diagram showing an example NDC 109, according to various embodiments described herein. The NDC 109 includes an orchestrator 149, a network function (xNF) 163, an NDC vendor 155, and a data pool 169. The orchestrator 149, xNF 163, and NDC vendor 155 each include a producer and consumer which operates in a similar manner to the producer 123 and consumer 125, respectively. The NDC vendor 155 includes a vendor pool 161 which operates in a similar manner to the vendor pool 131. The data pool 169 stores data used by, produced by, or is otherwise stored by, the NDC 109.

Figure 1E:
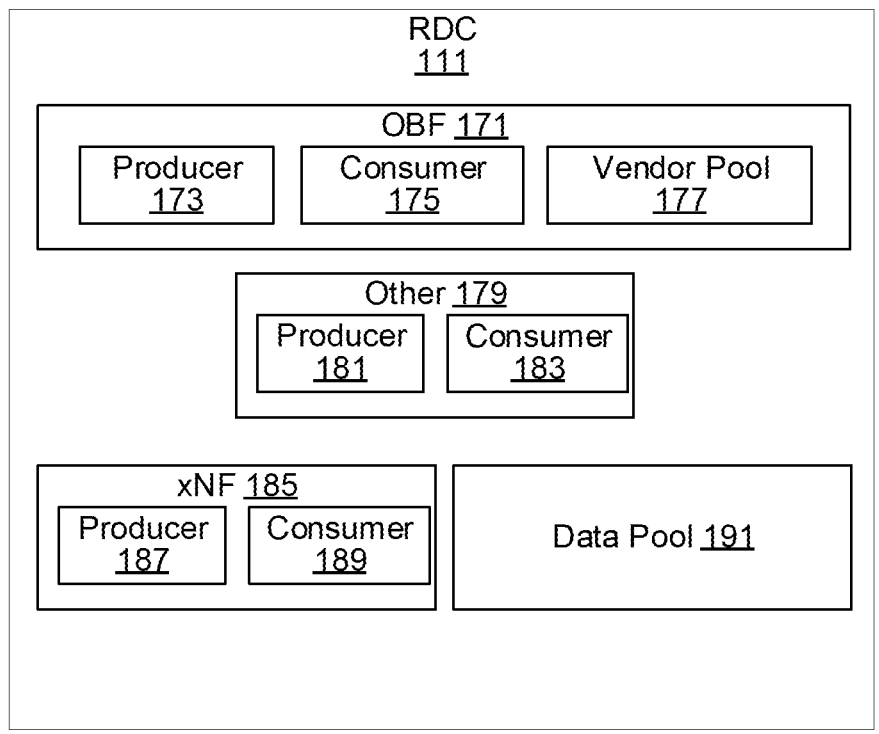
FIG. 1e is a display diagram showing an example RDC, according to various embodiments described herein.

FIG. 1e is a display diagram showing an example RDC 111, according to various embodiments described herein. The RDC 111 includes an onboard function (OBF) 171, other functions 179, an xNF 185, and a data pool 191. The OBF 171, other functions 179, and xNF 185, each include a producer and consumer which operate in a similar manner to the producer 123 and consumer 125, respectively. The OBF 171 further includes a vendor pool 177 which is similar to the vendor pool 131. The data pool 191 operates in a similar manner to the data pool 169.

While FIGS. 1a-1e depict the several components as part of a distributed data platform, one of skill in the art would recognize that these components may be layered and exist across many different physical locations, such as a national data center, regional data center, other data centers, cell sites, etc. Furthermore, one of skill in the art would recognize that each of the components described in connection with FIGS. 1a-1e may produce data or be monitored by specific components to produce data. Furthermore, one of skill in art would recognize that data pools, which may together comprise a distributed data lake, are potentially present in each physical, logical, or virtual instance.

Additionally, one of skill in the art would recognize that the OSS/BSS and NDC/RDC are examples and may not be relevant in all embodiments or implementations of the distributed data platform. Such concepts may also be extensible to other network structures and components, such as MEC, LZ/Outposts ("EDC"), etc.

In some embodiments, one or more of the components of the distributed data platform, including the components described in connection with FIGS. 1a-1e, may include databases, such as: persistent databases serving a known set of functions as an aggregation point for a subset of data, for example, a data inventory; transient on-demand working data sets; or other databases or data sets used to perform the operations of the components, the distributed data platform, etc.

Example embodiments described herein provide applications, tools, data structures and other support to implement systems and methods for operating a distributed data platform. The example embodiments described herein additionally provide applications, tools, data structures and other support to implement systems and methods for moving data throughout the distributed data platform. Other embodiments of the described techniques may be used for other purposes, including for determine whether an event has occurred, and whether certain data may be requested by a network infrastructure component. In the description provided herein, numerous specific details are set forth in order to provide a thorough understanding of the described techniques. The embodiments described also can be practiced without some of the specific details described herein, or with other specific details, such as changes with respect to the ordering of processes or devices, different processes or devices, and the like. Thus, the scope of the techniques and/or functions described are not limited by the particular order, selection, or decomposition of steps described with reference to any particular module, component, or routine.

Figure 2:
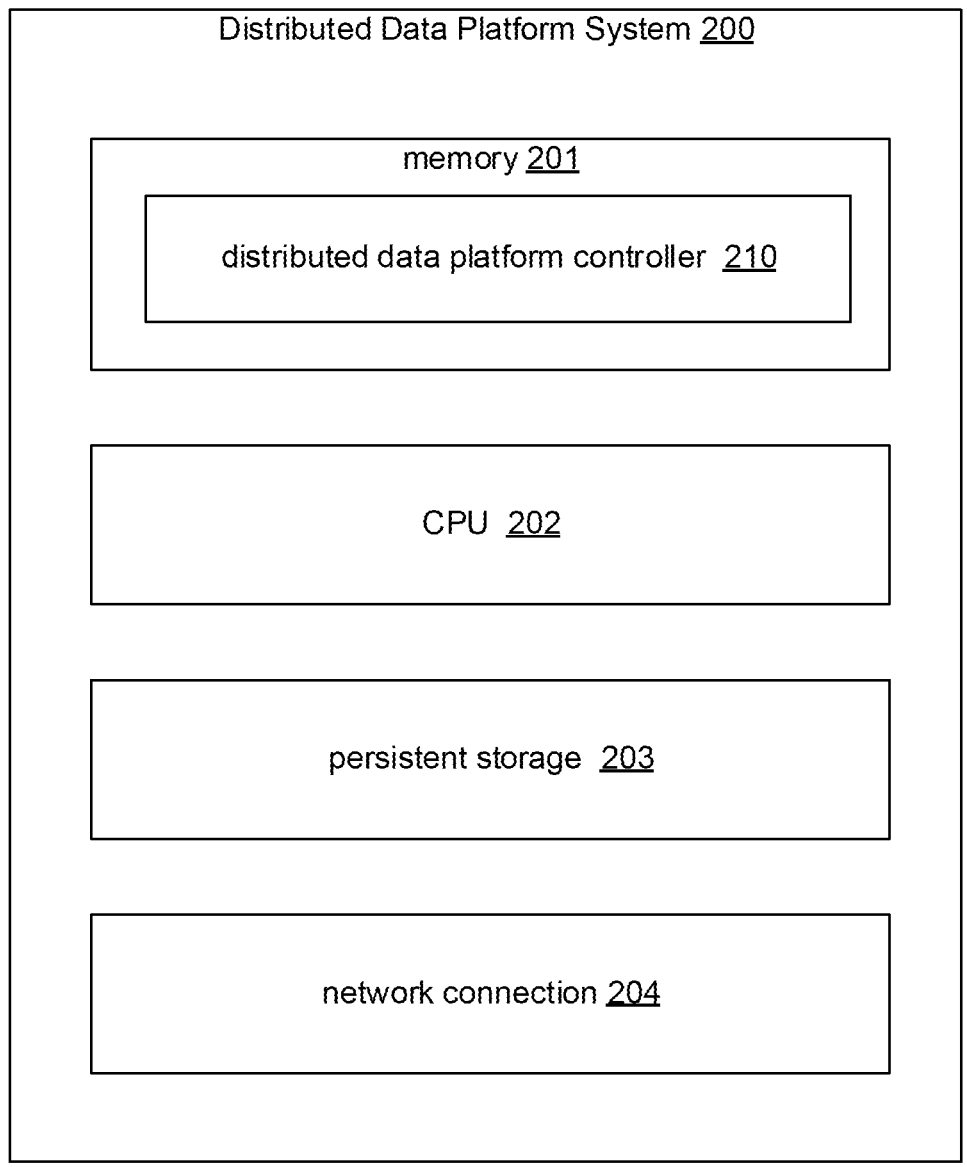
FIG. 2 is a block diagram depicting example components incorporated in a distributed data platform system, according to various embodiments described herein.

FIG. 2 is a block diagram depicting example components incorporated in a distributed data platform system, according to various embodiments described herein. The distributed data platform system 200 may be: located on the network 100 in a position to communicate with a network infrastructure component; integrated as part of a network infrastructure component; integrated on a as part of a plurality of network infrastructure component; or portions of the distributed data platform may be integrated in a plurality of network infrastructure components. In various embodiments, the distributed data platform system 200 includes one or more of the following: a computer memory 201 for storing programs and data while they are being used, including data associated with the various network infrastructure components and the distributed data platform system 200, an operating system including a kernel, and device drivers; a central processing unit (CPU) 202 for executing computer programs; a persistent storage device 203, such as a hard drive or flash drive for persistently storing programs and data; and a network connection 204 for connecting to one or more network infrastructure components and/or other computer systems, to send and/or receive data, such as via the Internet or another network and associated networking hardware, such as switches, routers, repeaters, electrical cables and optical fibers, light emitters and receivers, radio transmitters and receivers, and the like, and to scan for and retrieve signals from network infrastructure components, and/or other network functions, and for connecting to one or more computer devices such as network infrastructure components and/or other computer systems. In various embodiments, the CPU 202 may be a GPU, a DPU, or other "compute" hardware capable of performing logical operations. In various embodiments, the persistent storage device 203 may be, or include, a temporary storage device. In various embodiments, the distributed data platform system 200 additionally includes input and output devices, such as a keyboard, a mouse, display devices, etc.

While a distributed data platform system 200 configured as described may be used in some embodiments, in various other embodiments, the distributed data platform system 200 may be implemented using devices of various types and configurations, and having various components. The memory 201 may include a distributed data platform controller 210 which contains computer-executable instructions that, when executed by the CPU 202, cause the distributed data platform system 200 to perform the operations and functions described herein. For example, the programs referenced above, which may be stored in computer memory 201, may include or be comprised of such computer-executable instructions. The memory 201 may also include a network infrastructure component data structure.

The distributed data platform controller 210 performs the core functions of the distributed data platform system 200, as discussed herein and also with respect to FIGS. 3 through 7. In particular, the distributed data platform controller 210 facilitates the management of data produced, consumed, stored, or otherwise used or accessible by the distributed data platform. Additionally, the distributed data platform controller 210 may determine whether data may be required by a network infrastructure component when an event occurs. The distributed data platform controller 210 may also determine prepare the data to be transferred to the other network infrastructure component. In some embodiments, the distributed data platform controller 210 uses a message broker. In some embodiments, the distributed data platform controller 210 uses statistical analysis, an artificial intelligence or machine learning model trained to predict whether certain data will be used by a network infrastructure component when an event occurs, or some combination to determine whether data will be requested by a second network infrastructure component. In some embodiments, the distributed data platform controller 210 includes models which can be transmitted to other network infrastructure components. In some embodiments, the distributed data platform controller 210 includes one or more consumer models used to process, manage, or otherwise consume data produced by a network infrastructure component, or received from another network infrastructure component.

In an example embodiment, the distributed data platform controller 210 and/or computer-executable instructions stored on memory 201 of the distributed data platform system 200 are implemented using standard programming techniques. For example, the distributed data platform controller 210 and/or computer-executable instructions stored on memory 201 of the distributed data platform system 200 may be implemented as a "native" executable running on CPU 202, along with one or more static or dynamic libraries. In other embodiments, the distributed data platform controller 210 and/or computer-executable instructions stored on memory 201 of the distributed data platform system 200 may be implemented as instructions processed by a virtual machine that executes as some other program.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the distributed data platform system 200.

In addition, programming interfaces to the data stored as part of the distributed data platform controller 210 can be available by standard mechanisms such as through C, C++, C#, Java, and web APIs; libraries for accessing files, databases, or other data repositories; through scripting languages such as JavaScript and VBScript; or through Web servers, FTP servers, or other types of servers providing access to stored data. The distributed data platform controller 210 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the distributed data platform system 200 and network infrastructure components.

Furthermore, in some embodiments, some or all of the components/portions of the distributed data platform controller 210, and/or functionality provided by the computer-executable instructions stored on memory 201 of the distributed data platform system 200 may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the servers, functions, user equipment, etc., present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

FIG. 3 is a table diagram representing an infrastructure component data table 300, according to various embodiments described herein. The infrastructure component data table 300 includes a component id column 310, a data produced by component column 311, and a data consumed by component column 312. In some embodiments, the infrastructure component data table 300 includes additional columns used to identify access control, security, etc. for components identified in the infrastructure component data table. The component id column 310 includes information used to specify a specific network infrastructure component. The data produced by component column 311 includes information used to specify data that a component produces. The data consumed by component 312 includes data that a component consumes.

For example, as shown in row 301, the NDC Orchestrator may produce inventory data requested by a network infrastructure component, among other types of data. Further, the NDC Orchestrator may consume inventory data received from an inventory database and data received from an Onboard Function, or OBF, among other types of data. In some embodiments, the inventory data includes: virtual, physical, or logical instance data; location data; change data/metadata; and relationships between the inventory data. As another example, as shown in row 302, the OSS Inventory produces inventory data and consumes element state data, requested inventory data, and physical, expected, or planned metadata.

As yet another example, the RDC in row 303 does not produce data, as the RDC performs functions, but the RDC OBF of row 304 produces data describing the RDC. The RDC consumes inventory data requested by a network infrastructure component. The RDC OBF of row 304 produces data regarding faults, alerts, performance metrics, and other onboard function data. The RDC OBF consumes inventory data, such as the data produced by the OSS Inventory of row 302. In this example, and in some embodiments, the RDC onboard function is present in more parts of the network than the RDC itself.

Figure 4:
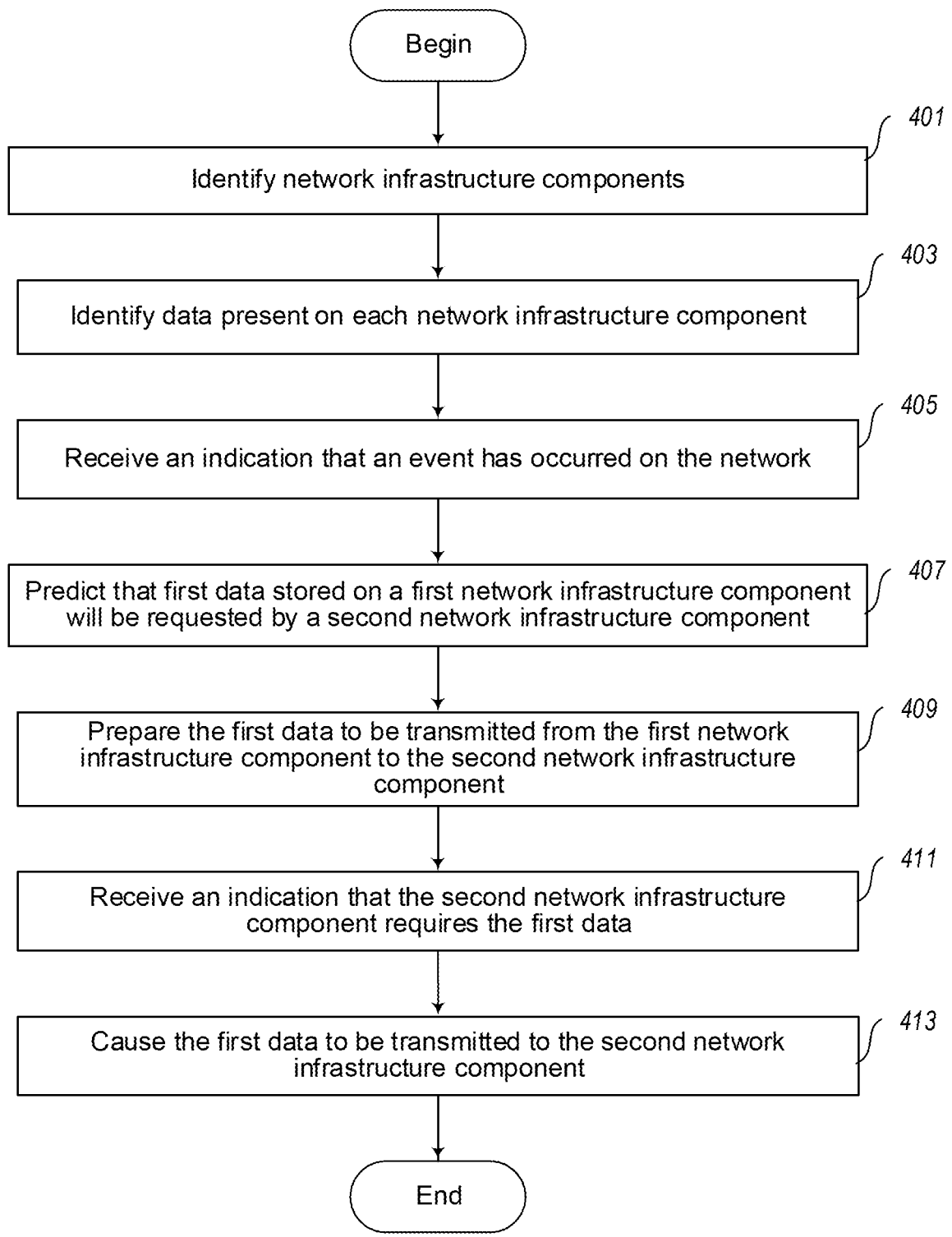
FIG. 4 is a flow diagram depicting a process for predicting whether a network infrastructure component will require certain data.

FIG. 4 is a flow diagram depicting a process for predicting whether a network infrastructure component will require certain data. At act 401, the distributed data platform identifies network infrastructure components connected to a network. At act 403, the distributed data platform identifies data present on each network infrastructure component. At act 405, the distributed data platform receives an indication that an event has occurred on the network.

At act 407, the distributed data platform predicts that data stored, or present, on a first network infrastructure component will be requested by a second network infrastructure component. In some embodiments, the distributed data platform predicts whether the data will be requested by using one or more of: statistical analysis, artificial intelligence, or a machine learning model trained to predict whether data will be required by a network infrastructure component based on at least an indication that an event has occurred.

At act 409, the distributed data platform prepares the data to be transmitted from the first network infrastructure component to the second network infrastructure component. In some embodiments, preparing the data for transmission includes transmitting the data to a third network infrastructure component.

At act 411, the distributed data platform receives an indication that the second network infrastructure component requires the data. At act 413, the distributed data platform causes the data to be transmitted to the second network infrastructure component. In some embodiments the data is transmitted to the second infrastructure component in real time. The data may be transmitted using a message broker, such as a Kafka message broker. The data may be streamed to the second network infrastructure component. After act 413, the process ends.

Figure 5:
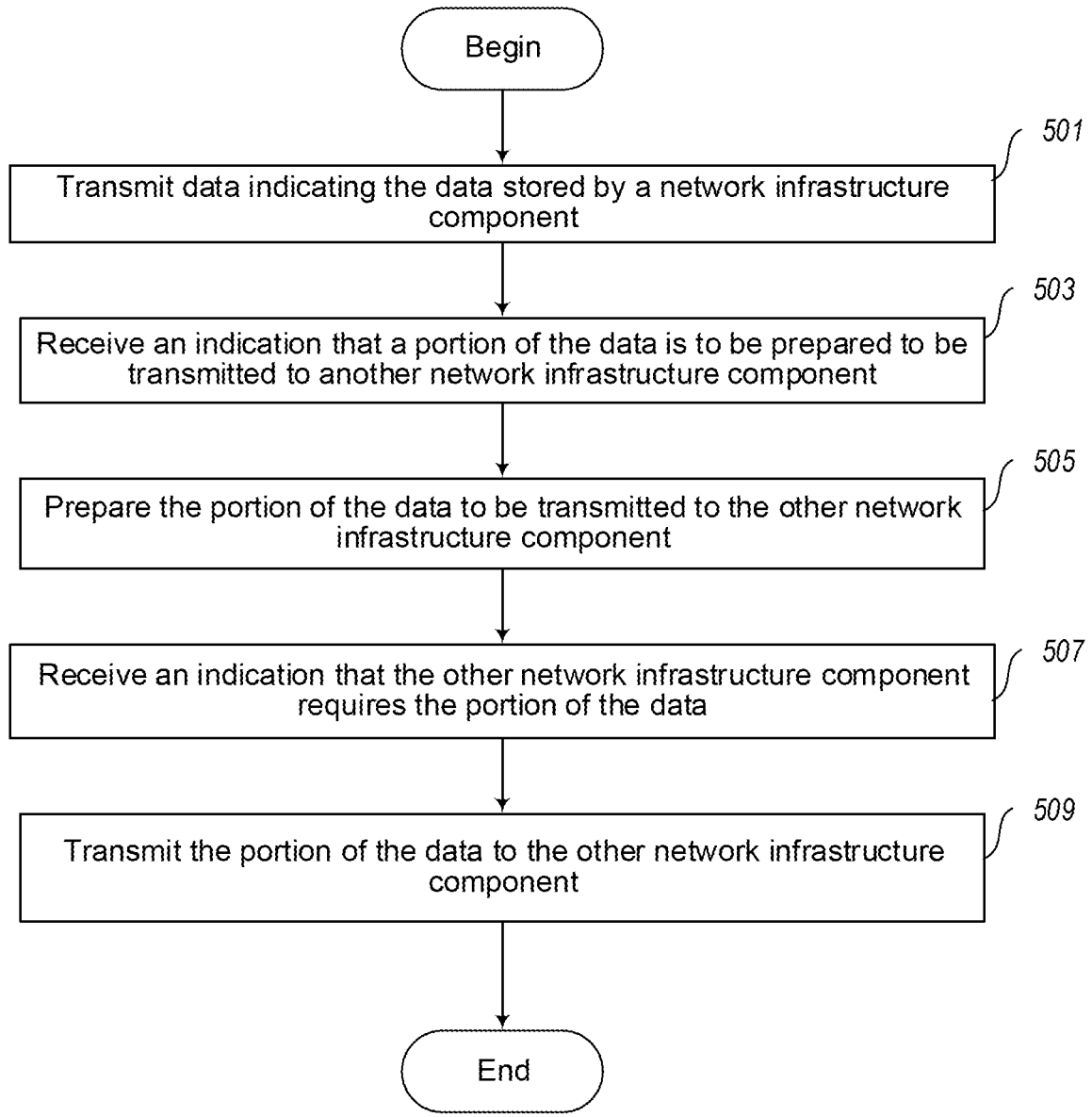
FIG. 5 is a flow diagram depicting a process for operating a network infrastructure component in a distributed data platform, according to various embodiments described herein.

FIG. 5 is a flow diagram depicting a process for operating a network infrastructure component in a distributed data platform, according to various embodiments described herein. At act 501, the network infrastructure component transmits data indicating the data stored by the network infrastructure component to a distributed data platform system. At act 503, the network infrastructure component receives an indication that a portion of the data stored by the network infrastructure component is to be prepared to be transmitted to another network infrastructure component.

At act 505, the network infrastructure component prepares the portion of the data to be transmitted to the other network infrastructure component. At act 507, the network infrastructure component receives an indication that the other network infrastructure component requires the portion of the data. At act 509, the network infrastructure component transmits the portion of the data. After act 509, the process ends.

Figure 6:
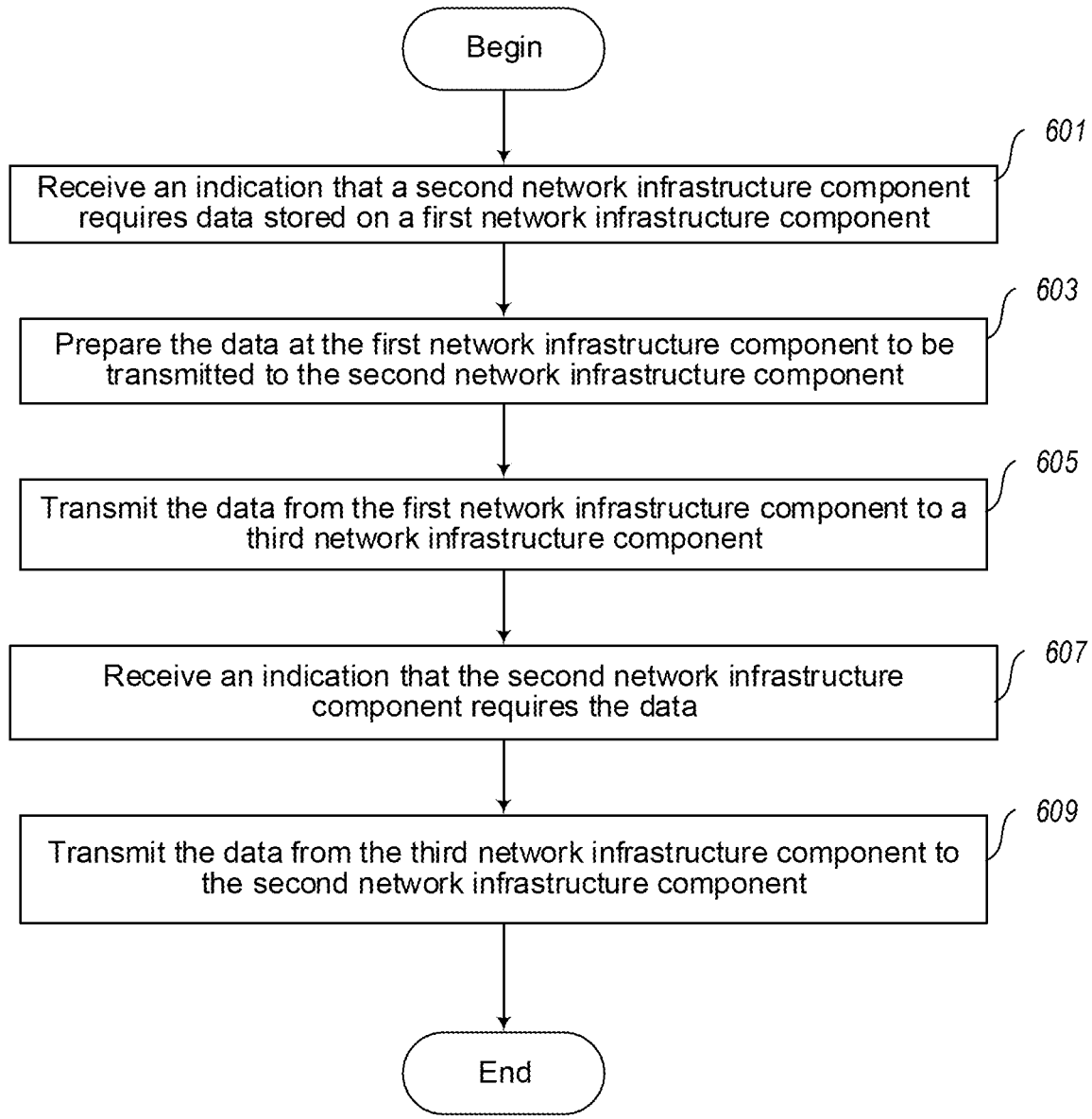
FIG. 6 is a flow diagram depicting a process for using an intermediary network infrastructure component to prepare data to be transmitted between network infrastructure components, according to various embodiments described herein.

FIG. 6 is a flow diagram depicting a process for using an intermediary network infrastructure component to prepare data to be transmitted between network infrastructure components, according to various embodiments described herein. At act 601, a distributed data platform receives an indication that a second network infrastructure component requires data stored on a first network infrastructure component. At act 603, the distributed data platform causes the data on the first network infrastructure component to be prepared to be transmitted to the second network infrastructure component.

At act 605, the distributed data platform causes the data to be transmitted from the first network infrastructure component to a third network infrastructure component. In some embodiments, the third network infrastructure component is identified based on a logical relation, geographic location, or another method of identifying a proper intermediary network infrastructure component.

At act 607, the distributed data platform receives an indication that the second network infrastructure component requires the data. At act 609, the distributed data platform causes the data to be transmitted from the third network infrastructure component to the second network infrastructure component. After act 609, the process ends.

Figure 7:
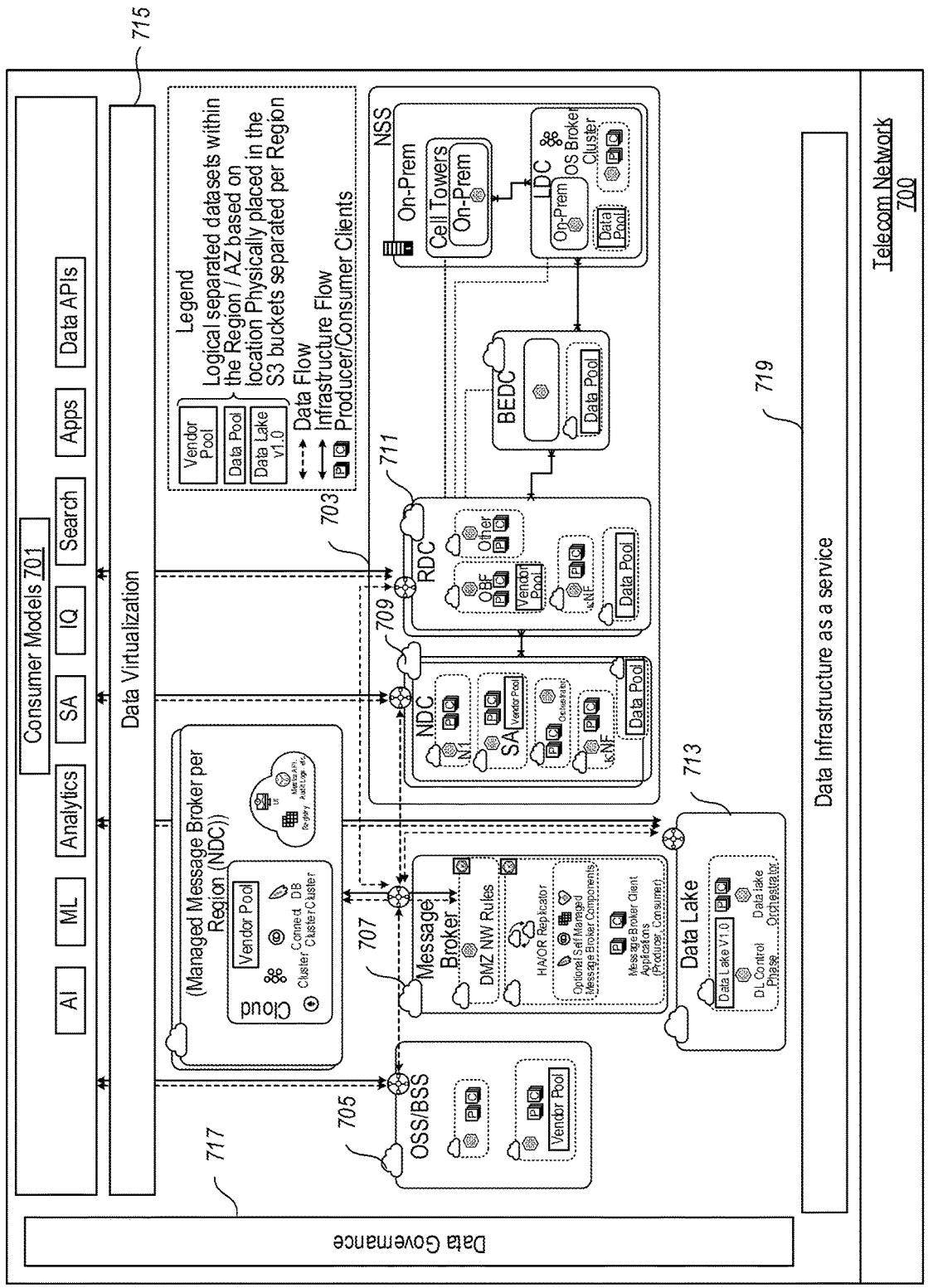
FIG. 7 is a display diagram showing a use-case example of a sample telecom network, according to various embodiments described herein.

FIG. 7 is a display diagram showing a use-case example of a sample telecom network 700, according to various embodiments described herein. The telecom network 700 includes infrastructure components, such as the consumer models 701, an NSS 703, an OSS/BSS 705, a message broker 707, an NDC 709, an RDC 711, and a data lake 713. The consumer models 701 are similar to the consumer models 101. The NSS 703 is similar to the NSS 103. The OSS/BSS 705 is similar to the OSS/BSS 105. The message broker 707 is similar to the message broker 107. The NDC 709 is similar to the NDC 109. The RDC 711 is similar to the RDC 111. The data lake 713 is similar to the data lake 113. Each of the components in FIG. 7 include sub-components which are the same or similar to those corresponding similar components in FIGS. 1A to 1E. In some embodiments, the network infrastructure components use transit gateways to transmit data outside of the respective network infrastructure component.

In the sample telecom network 700, one or more consumer models 701 exist on each of the network infrastructure components shown in the telecom network. The consumer models 701 are used by the telecom network to perform the at least part of the functions provided by the telecom network.

The sample telecom network 700 may additionally include layers, such as the data virtualization layer 715, the data governance layer 717, and the data infrastructure as a service layer 719. The data virtualization layer 715 is a semantic layer of data that makes data across the network available to network infrastructure components. The data virtualization layer 715 is thus able to logically keep the data together. The data virtualization layer 715 may include data definitions describing what data exists, where the data exists, the types of data structures, etc.

The data governance layer 717 is a layer which manages the security permissions, rules, polices, regulations, and other aspects which allow data governance. This may include, but is not limited to: how data is distributed; the impact of certain roles, of network infrastructure components, users, and others trying to access the data, on access to data; the ownership of the data; and other aspects related to how data is governed.

The data infrastructure as a service layer (or "data infrastructure layer") 719 is a layer which manages the diverse architectures and technologies used by the telecom network 700. The data infrastructure layer 719 is able to make the infrastructure of the telecom network, such as the network infrastructure components, the models used by network infrastructure components, the data produced by network infrastructure components, etc., available to third parties, as well as other network infrastructure components.

The example telecom network 700 may be developed with a variety of guiding principles for the data. The following principles are guiding principles used in the example telecom network 700, however other principles may be used. Furthermore, while a variety of principles are described below, any number of the following principles, other principles, etc., may be used in various embodiments. Under one principle, the owner of the telecom network 700 owns all of the data, including data produced by third parties.

Under another principle, the data is democratized to support agile consumer models, including business and network analytics. Data access may be enforced based on polices, such as security policies, non-disclosure agreements, customer agreements, and other policies which affect the use of data. Domain datasets are distributed, discoverable, and able to be accessed, controlled, and governed by network infrastructure components. Furthermore, all data in the data lake is governed to enable enrichment by data consumers and "reconciliation" by data lake operations.

Another principle states that data agreements are defined with all sources and source types. This may include the data payload, ingest patterns, location of data, intent of onboarding data, etc. Vendors must conform to supported data formats and structures, protocols for data ingestion, and must have integration capabilities with tools defined by the network owner.

According to another principle, the data lake should support the data platform. Supporting the platform may include enabling a variable data structure, assisting with latency, assisting with the volume of data, assisting with the quality of service for users of the network, and assisting with pre-defined or on-demand needs for network infrastructure components.

Another principle states that data should be stored schema-free. Thus, the data is modeled into a fixed schema as late as possible, such as, for example, right before use by a network infrastructure component.

Another principle states that the data platform provides an ecosystem of consumable data products, such as data warehousing, data services, or semantic layers, as independent version-aware terminal points. The data platform also provides consumer models in consumable formats to avoid additional programing for preparation. Furthermore, data computation techniques, modelling, semantic layers, and data feedback is available and independent of the data itself.

Another principle states that the vendors cannot "lock-in" data designs, logic, and dependencies. Thus, data is portable between different hosting environments, frameworks, etc., in an agile manner.

Another principle states that data models and products are to be self-documented and propagated with access to all dependences. The data models and products should be accessible programmatically.

Another principle states that domain driven data products are made available. This may include data, metadata, and semantic data being able to adapt to changes in definition and meaning. Thus, the data is kept independent of the network infrastructure technology and components.

The example telecom network 700 may be developed with a variety of guiding principles for the data platform. The following principles are guiding principles used in the example telecom network 700, however other principles may be used. Under one principle, the owner of the telecom network 700 up to one data pool may be used in a network infrastructure component. Under this principle, an additional data pool is not created if a vendor pool covers the entire dataset in a datacenter. Furthermore, one data lake is used by the network owner.

According to another principle, a data pool or data lake is to be placed closer to the source of data and should support fit-for-purpose architectures. The data pool or data lake can support hybrid environments, such as on-prem, public cloud, or other environments for distributed computing and storage architectures. Furthermore, data procurement processes should consider matching stipulations and characteristics to the network owner's data lake or data pools for interactions.

According to another principle, all components and capabilities are to be built modular as microservices. The microservices are to have REST or other enabled interfaces, and should support dynamic configuration of components, like storage, computing, workflows, and frameworks. The microservices should also support capabilities such as, onboarding, instantiation, provisioning, resource scaling, etc. The architecture should be decoupled to allow for flexibility to add or remove components and capabilities as and where needed. Furthermore, the data platform should have a unified orchestration, governance, and metadata paradigm enable architecture across distributed data pools and the data lake. Frameworks and processes within the data platform should be capable to adapt to newer formats and data structures over time.

Another principle states that the architecture should support bi-directional interworking with external niche vendors and frameworks for specialized capabilities, such as databricks, orchestration products for data, metadata, logic, etc., and vendor data pools.

Another principle states that the data lake capabilities and components must be available for self-service including data access, exploration, source onboarding, pipeline designs, scaling, monitoring, performance capabilities, etc. Additionally, the architecture should be able to serve as the backend to support data analytics.

Under another principle, capabilities like data-movement, data-processing, etc. at all data lake components are regulated by the network owner's cost-to-value evaluations. The evaluations are definable and enforceable to all capabilities, components and work-flow tiers. Furthermore, onboarding, ingesting, data movement and processing within a data lake should be driven by a business, consumer, operations, research, or automation use case. The data platform and network infrastructure components should implement and use existing technologies prior to looking for new architectures, technology and tools.

According to another principle, network infrastructure components should be able to securely isolate their capabilities, components, and work-flows, including components under the control of third parties.

According to another principle, data configuration should be driven by active and agile governance for data quality and data security (including de-identification, classification based routing, privilege management) at all levels of data, metadata, processes, and work-flows to support regulatory requirements, compliance requirements, or other customer requirements. The network owner should control all data governance policies, and the governance policies should extend to all customers and systems inter-working with the network's data.

Under another principle, the data platform should include proactive and reactive governance models with version management of the policies at each tier.

Another principle states that the data lake should be highly available and durable, with as little downtime as possible. The tiers of the data lake and their specific requirements may be defined to implement dynamic optimization of services, operations, features, etc. The data lake components and capabilities may be designed to adapt to better technologies over time. The data platform should have a unified orchestration and centralized governance and discoverability for the platform, the distributed data, and the models.

Another principle states that the "dev-ops," continuous integration, and continuous deployment) should be used to automate incident response, performance and cost for reactive and proactive optimizations, code releases, configuration and change management and data migration needs, while preventing data losses and protecting from threats. Furthermore, third parties are to support and manage the lifecycle of their products, partners, open source components, etc.

Another principle states that like new sandboxes, continuous meta orchestration, continuous testing, and continuous monitoring are used by the network owner to manage the quality, cycle-time, or data analytics from data in production. Furthermore, models, such as AI models, machine learning models, and other consumer models should be used for data processing and consumption.

In an example embodiment, and by utilizing at least some of the processes, principles, components, etc., described herein, the distributed data platform is able to provide a data consumer or data producer (collectively a "vendor"), with access to data produced or consumed by the network. In this example embodiment, the distributed data platform is able to provide the vendor with dynamic access to data observability, data streaming, data lakes and data pools, inventory databases, a design studio for designing network applications, defect logs and data enrichment, end to end digital twins, data patterns and tremors, golden clusters, testing for SLOs, as-built performance for applications, etc.

In this example embodiment, the distributed data platform may include principles, such as those described above. As an example, some of the principles may include: requiring all data to flow through the platform to prevent "orphan data" and disconnected systems; having a distributed network which includes an interconnected system of data lakes and pools with dynamic, on-demand, edge-intelligent properties; building the data platform as an application running on the network which is built with cloud-native principles; allowing customers, vendors, and partners to consume and contribute data; and using data to enhance the network.

Furthermore, in this example embodiment, the distributed data platform may include multiple layers, such as: an agent layer for user-systems performing data operations; an enrichment layer for systems, including distributed processing systems, combining and processing data; a source layer for systems, including distributed processing systems, storing and transferring data; and a control plan for data management. The control plane may enforce data policies, monitor data, observe data flow, and manage distributed processing for the data produced at and flowing between each layer. The control plane ensures that data is cataloged and that all data is accessed via centralized roles.

Thus, in this example embodiment, the distributed data platform is able to facilitate the distribution of data across the entire network by storing data locally in network infrastructure components and using the control plane to allow components or devices at each layer to access the data.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
at least one processor; and
at least one memory coupled to the at least one processor, the memory having computer-executable instructions stored thereon that, when executed by the at least one processor, cause the system to perform:
electronically identifying a plurality of network infrastructure components, each network infrastructure component being connected to a network, and each network infrastructure component being configured to provide one or more networking services to user equipment;
for each network infrastructure component of the plurality of network infrastructure components:
electronically identifying data stored on the network infrastructure component;
electronically receiving an indication that a network event has occurred on the network;
electronically predicting that a portion of the data stored by a first network infrastructure component of the plurality of network infrastructure components will be requested by a second network infrastructure component of the plurality of network infrastructure components based on the indication that the network event has occurred, wherein the portion of the data includes data related to providing one or more networking services to user equipment;
electronically preparing the portion of the data to be transmitted from the first network infrastructure component to the second network infrastructure component based on the prediction that the portion of the data will be requested by the second network infrastructure component;
electronically receiving an indication that the second network infrastructure component requires the prepared data; and
electronically causing the data to be transmitted to the second network infrastructure component.

2. The system of claim 1, wherein electronically causing the prepared data to be transmitted to the second network infrastructure component comprises:
electronically causing the prepared data to be transmitted to the second network infrastructure component in near-real time.

3. The system of claim 2, wherein electronically causing the prepared data to be transmitted to the second network infrastructure component in near-real further comprises:
electronically utilizing a message broker to cause the data to be transmitted.

4. The system of claim 2, wherein electronically causing the prepared data to be transmitted to the second network infrastructure component further comprises:
electronically causing the prepared data to be streamed to the second network infrastructure component.

5. The system of claim 1, wherein the prepared data further comprises:
a model used by the second network infrastructure component to process data accessible by the second network infrastructure component.

6. The system of claim 5, wherein the computer-executable instructions further cause the system to:
electronically receive an indication that the second network infrastructure component has altered an aspect of the model; and
electronically cause a third network infrastructure component which uses the model, to receive the altered model.

7. The system of claim 6, wherein the altered aspect of the model comprises weights of the model.

8. The system of claim 1, wherein preparing the data to be transmitted to the second network infrastructure component further comprises causing the prepared data to be transmitted to a third network infrastructure component.

9. The system of claim 1, wherein the computer-executable instructions further cause the system to:
for each network infrastructure component of the plurality of network infrastructure components:
electronically receive data indicating one or more data standards; and
electronically determine whether the network infrastructure component is producing data based on the received one or more data standards.

10. A method in a first network infrastructure component connected to a network, the first network infrastructure component being configured to provide one or more networking services to user equipment, the method comprising:
transmitting data indicating data stored by the first network infrastructure component;
receiving an indication that a portion of the data stored by the first network infrastructure component for providing one or more networking services to user equipment is to be prepared to be transmitted to a second network infrastructure component based on a prediction that the portion of the data will be required by the second network infrastructure component;
preparing the portion of the data to be transmitted to the second network infrastructure component;
receiving an indication that the second network infrastructure component requires the portion of the data; and
transmitting the portion of the data to the second network infrastructure component.

11. The method of claim 10, wherein transmitting the portion of the data comprises transmitting the portion of the data to the second network infrastructure component in real-time.

12. The method of claim 11, wherein transmitting the portion of the data comprises transmitting the portion of the data to the second network infrastructure component by using a message broker.

13. The method of claim 11, wherein transmitting the portion of the data comprises streaming the portion of the data.

14. The method of claim 10, wherein the portion of the data comprises a model used by the second network infrastructure component to process data accessible to the second network infrastructure component.

15. The method of claim 14, further comprising:
receiving an indication that the model was altered by the second network infrastructure component; and
altering the model based on the received indication that the model was altered by the second network infrastructure component.

16. The method of claim 10, wherein preparing the portion of the data further comprises:
receiving an indication of an intermediary network infrastructure component; and
transmitting the data to the intermediary network infrastructure component.

17. One or more storage devices collectively storing a network infrastructure data structure for access and processing by a program executed by at least one computer processor that, when accessed and processed by at least one computer processor, functionally enables the at least one computer processor to:
predict that a portion of data stored on a first network infrastructure component of a plurality of network infrastructure components will be requested by a second network infrastructure component of the plurality of network infrastructure components, the portion of data being related to providing one or more networking services to user equipment, the first network infrastructure component being configured to provide one or more networking services to user equipment; and
cause the portion of data to be transmitted from the first network infrastructure component to the second network infrastructure component, the network infrastructure data structure comprising:
information specifying the plurality of network infrastructure components;
for each network infrastructure component of the network infrastructure components:
information indicating data stored by the network infrastructure component; and
information specifying an indication that an event has occurred in the network, such that the information specifying an indication that an event has occurred in the network is usable to predict that the second network infrastructure component will request the portion of data, and such that the prediction that the second network infrastructure component will request the portion of data is usable to prepare the portion of data to be transmitted from the first network infrastructure component to the second network infrastructure component.

18. The one or more storage devices of claim 17, wherein the portion of data further comprises a model.

19. The one or more storage devices of claim 17, wherein the network infrastructure data structure further comprises:
information specifying a third network infrastructure component of the plurality of network infrastructure components,
such that preparing the data to be transmitted to the second network infrastructure component includes transmitting the data to the third network infrastructure component.

* * * * *